(12) United States Patent
Fu

(10) Patent No.: US 9,087,107 B2
(45) Date of Patent: Jul. 21, 2015

(54) RANK-SPECIFIC SEARCH RESULTS

(75) Inventor: John Eric Fu, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 441 days.

(21) Appl. No.: 13/517,651

(22) Filed: Jun. 14, 2012

(65) Prior Publication Data

US 2015/0161125 A1 Jun. 11, 2015

(51) Int. Cl.
*G06F 17/30* (2006.01)
(52) U.S. Cl.
CPC ...... *G06F 17/3053* (2013.01); *G06F 17/30554* (2013.01)
(58) Field of Classification Search
None
See application file for complete search history.

(56) References Cited

U.S. PATENT DOCUMENTS

| 7,831,582 | B1 * | 11/2010 | Scofield et al. | 707/706 |
| 2004/0199419 | A1 * | 10/2004 | Kim et al. | 705/14 |
| 2011/0153583 | A1 * | 6/2011 | Goldband | 707/706 |

OTHER PUBLICATIONS

Clarke, "Google Maps Gets Short URL's", Jul. 10, 2010, 10 pages.
Google, Inc., "Zero Clipboard", http://code.google.com/p/zeroclipboard, 2011, 2 pages.
Jenna Wortham, "The Times and Bit.ly Roll Out 'nyti.ms' Short Links", http://bits.blogs.nytimes.com/2009/12/16/the-times-and-bitly-roll-out-nytims-short-links/?_r=1, Dec. 16, 2009, 9 pages.

* cited by examiner

*Primary Examiner* — Rehana Perveen
*Assistant Examiner* — Hung Havan
(74) *Attorney, Agent, or Firm* — Harrity & Harrity, LLP

(57) ABSTRACT

A computing device may receive a request for a rank-specific search link corresponding to a particular search result within a list of search results. The computing device may identify one or more search parameters used by a search engine to generate the list of search results, and identify a search result rank position of the particular search result in the list of search results. The computing device may create a rank-specific search link associated with the one or more search parameters corresponding to the list of search results and the search result rank position corresponding to the particular search result. The computing device may provide the rank-specific search link in accordance with the request. Selection of the rank-specific search link may cause information, to be presented, relating to a document to the search parameters and corresponding to the search result rank position.

20 Claims, 7 Drawing Sheets

RANK-SPECIFIC SEARCH RESULTS

BACKGROUND

Many techniques are available to users today to find information on the World Wide Web ("web"). For example, users often use web browsers and/or search engines to find information of interest. In order to provide quality results to users, search engines often provide links to documents (e.g., web pages, websites, etc.) based on one or more search parameters.

SUMMARY

According to one possible implementation, a method may include receiving, by a computing device, a request for a rank-specific search link corresponding to a particular search result within a list of search results. The method may include identifying, by the computing device, one or more search parameters corresponding to the list of search results, by the computing device, a search result rank position corresponding to the particular search result. The method may include creating, by the computing device, a rank-specific search link associated with the one or more search parameters corresponding to the list of search results and the search result rank position corresponding to the particular search result. The method may include providing, by the computing device, the rank-specific search link in accordance with the request. Selection of the rank-specific search link may cause information, to be presented, relating to a document to the search parameters and corresponding to the search result rank position.

The search result rank position may include information such as a position, within the list of search results, corresponding to the particular search result.

The method may further include: receiving a search request comprising the one or more search parameters; producing the list of search results based on the one or more search parameters; and providing the list of search results in a search results document.

Each search result, in the list of search results, may correspond to a different search result rank position, and one of the search results may include a hyperlink corresponding to document associated with the one of the search results, and an interface object to request a rank-specific search link.

The rank-specific search link may include a different version of another rank-specific search link.

The method may further include: receiving a search request corresponding to the rank-specific search link; identifying the one or more search parameters associated with the rank-specific search link; identifying the search result rank position associated with the rank-specific search link; identifying a plurality of search results based on the one or more search parameters; identifying a search result, of the plurality of search results, that corresponds to the search result rank position within a search results document; and providing information regarding the search result, where the particular search result and the search result are associated with different documents, and the particular search result and the search result correspond to the same search result rank position.

The particular search result may include at least one of: a hyperlink corresponding to a particular document, a snippet of text from a content of a document description corresponding to a particular document, a document address corresponding to a particular document, or a search result rank position corresponding to the particular search result.

The search result may include at least one of: a hyperlink corresponding to a particular document, a document description corresponding to a particular document, a document address corresponding to a particular document, or a search result rank corresponding to the search result.

According to another possible implementation, a system may include a memory to store instructions and one or more processors to perform the instructions to receive a search request corresponding to a rank-specific search link. The rank-specific search link may be associated with one or more search parameters and a search result rank position. The one or more processors may identify the one or more search parameters associated with the rank-specific search link, identify the search result rank position associated with the rank-specific search link, and obtain a search result based on the one or more search parameters and corresponding to the search result rank position. The one or more processors may provide information regarding the search result in response to the request.

The rank-specific search link may include a different version of another rank-specific search link.

The one or more processors may be further to: receive a request for a particular rank-specific search link corresponding to a particular search result within a list of search results, the list of search results including search results in a ranked order; identify a plurality of search parameters corresponding to the list of search results; identify a particular search result rank of the particular search result in the list of search results; create a rank-specific search link associated with the plurality of search parameters corresponding to the list of search results, and the particular search result rank corresponding to the particular search result; and provide the particular rank-specific search link in accordance with the request.

The plurality of search parameters may include one or more search parameters, the particular search result rank position may include a search result rank position, the particular rank-specific search link may include a rank-specific search link, and the particular search result may not include the search result.

The processor may be further to: receive a search request comprising a set of search parameters; produce the list of search results based on the set of search parameters; and generate the search results document, where each search result, in the list of search results, may correspond to a different search result rank position, and the list of search results may include a hyperlink corresponding to a particular document, and an interface object to request a rank-specific search link.

The search result may include at least one of: a hyperlink corresponding to a particular document, a document description corresponding to a particular document, a document address corresponding to a particular document, or a search result rank corresponding to the search result.

According to another possible implementations, one or more non-transitory computer-readable storage media may include instructions that, when executed by a processor, cause the processor to receive a request for a rank-specific search link corresponding to a particular search result within a list of search results. The instructions may cause the processor to identify one or more search parameters corresponding to the search result, identify a search result rank position corresponding to the particular search result; and create the rank-specific search link. The instructions may cause the processor to create a different version of the rank-specific search link, associate the different version of the rank-specific search link with the search parameters corresponding to the search result, and associate the different version of the rank-specific search link with the search result rank position corresponding to the particular search result. The instructions may cause the processor to provide the rank-specific search link in accordance with the request. Selection of the rank-specific search link may cause information, to be presented, relating to a document to the search parameters and corresponding to the search result rank position.

The search result rank may include information such as a position, within the list of search results, corresponding to the particular search result.

The one or more instructions may cause the processor to: receive a search request comprising the one or more search parameter, produce the list of search results based on the one or more search parameters, and provide the list of search results in a search results document.

Each search result, in the list of search results, may correspond to a different search result rank position, and one of the search results may include a hyperlink corresponding to documents associated with the one of the search results, and an interface object to request a rank-specific search link.

The one or more instructions may cause the processor to: receive a search request corresponding to a particular rank-specific search link, where the rank-specific search link may be associated with one or more search parameters and a search result rank position; identify the one or more search parameters associated with the rank-specific search link; identify the search result rank associated with the rank-specific search link; obtain a search result based on the one or more search parameters and corresponding to the search result rank; and provide information regarding the search result in response to the search request.

The particular search result may include at least one of: a hyperlink corresponding to a particular document, a document description corresponding to the document, or a document address.

DETAILED DESCRIPTION

The following detailed description refers to the accompanying drawings. The same reference numbers in different drawings may identify the same or similar elements.

A system and method, described herein, may be used to enhance search engine services by creating rank-specific search links that, when selected or otherwise activated, may cause a search to produce a search result corresponding to a search result rank associated with the rank-specific search link. For example, a rank-specific search system may receive a request (e.g., from a user device) for a rank-specific search link (e.g., a hyperlink) corresponding to a particular search result, identify one or more search parameters and/or a search result rank corresponding to the search result, and create a rank-specific search link associated with the search parameters and the search result rank. In some implementations, the rank-specific search system may create a shortened version of the rank-specific search link to enhance the visual appeal and/or manageability of the rank-specific search link.

The rank-specific search system may also, or alternatively, receive a rank-specific search request (e.g., from the user device) corresponding to the rank-specific search link, identify the search parameters and the search result rank associated with the rank-specific search link, obtain search results based on the search parameters, and provide a rank-specific search result (e.g., to a user device) based on the search results and the search result rank. The rank-specific search result may include a particular search result, within a list of search results, corresponding to the search result rank position (also referred to herein as "rank") (e.g., the fifth search result to appear in a set of search results). Accordingly, the rank-specific search system may provide solutions to creating rank-based search links and solutions to providing a search result corresponding to a particular search result rank.

The concepts described herein may be applied to sets of documents. A document may be broadly interpreted to include any machine-readable and machine-storable work product. A document may include, for example, an e-mail, a web site, a file, a combination of files, one or more files with embedded links to other files, a news group posting, a news article, a blog, a business listing, an electronic version of printed text, a web advertisement, etc. In the context of the Internet, a common document is a web page. Documents often include textual information and may include embedded information, such as meta information, images, hyperlinks, etc., and/or embedded instructions, such as Javascript, etc. A link or a hyperlink, as the terms are used herein, are to be broadly interpreted to include any reference to/from a document from/to another document or another part of the same document.

Figure 1:
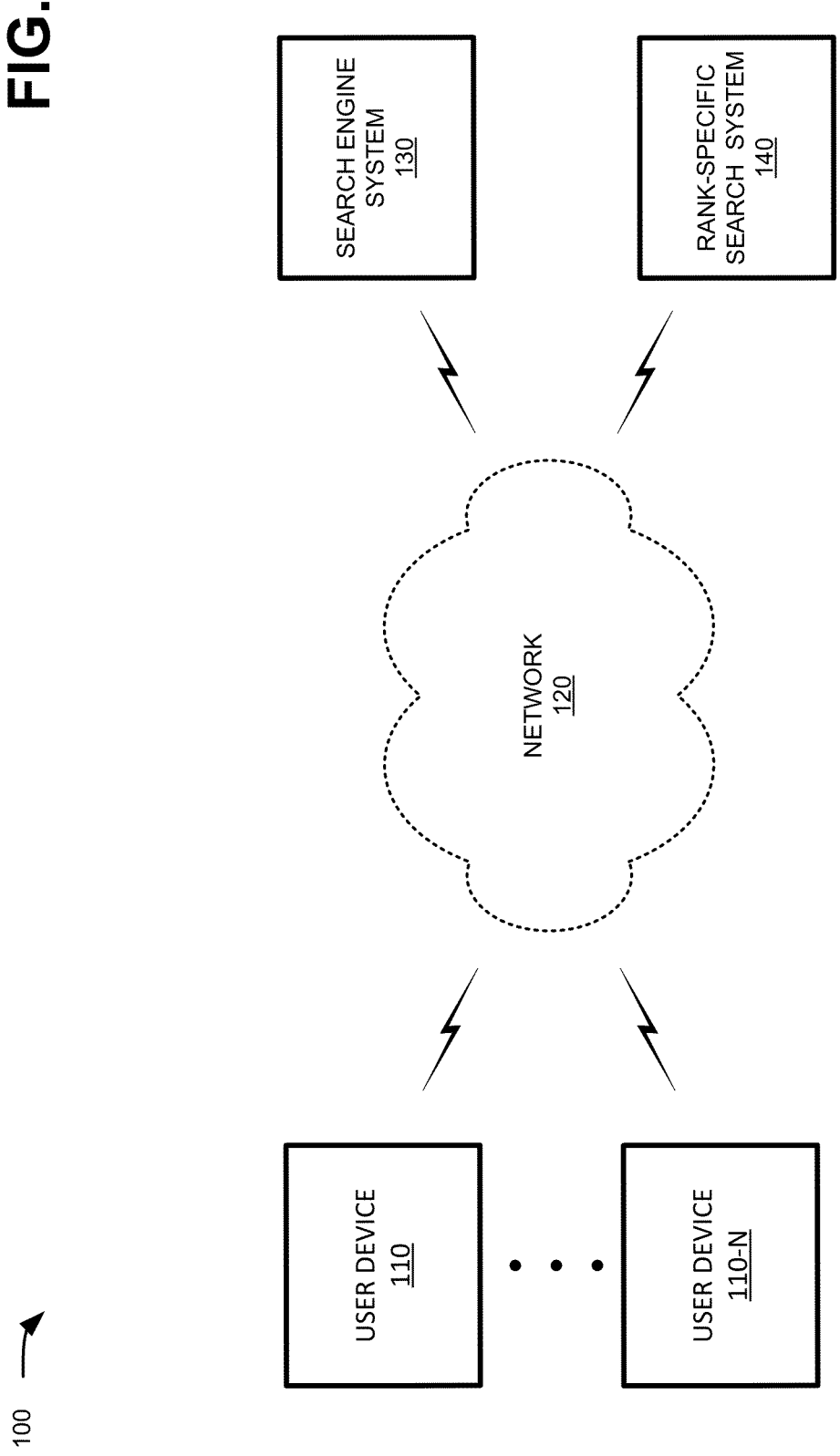
FIG. 1 is a diagram of an example environment in which systems and/or methods, described herein, may be implemented.

FIG. 1 is a diagram of an example environment 100 in which systems and/or methods described herein may be implemented. As depicted, FIG. 1 shows user devices 110-1, ..., 110-N (where N≥1) (hereinafter referred to collectively as "user devices 110," and individually as "user device 110"), network 120, search engine system 130, and rank-specific search system 140. The number of systems and/or networks, illustrated in FIG. 1, is provided for explanatory purposes only. In practice, there may be additional systems and/or networks, fewer systems and/or networks, different systems and/or networks, or differently arranged systems and/or networks than illustrated in FIG. 1.

Also, in some implementations, one or more of the systems of environment 100 may perform one or more functions described as being performed by another one or more of the systems of environment 100. Systems of environment 100 may interconnect via wired connections, wireless connections, or a combination of wired and wireless connections.

User device 110 may include one or more types of computing devices. For example, user device 110 may include a laptop computer, a desktop computer, a tablet computer, a netbook, a mobile telephone (e.g., a smart phone), or one or more other types of computing devices. User device 110 may be capable of communicating with network 120. In one example, user device 110 may be capable of sending a search to search engine system 130 and/or receiving a search result from search engine system 130.

Network 120 may include any type of network and/or combination of networks. For example, network 120 may include a LAN (e.g., an Ethernet network), a wireless LAN (WLAN) (e.g., an 802.11 network), a wide area network (WAN) (e.g., the Internet), a wireless WAN (WWAN) (e.g., a 3gpp System Architecture Evolution (SAE) Long-Term Evolution (LTE) network, a Global System for Mobile Communications (GSM) network, a Universal Mobile Telecommunications System (UMTS) network, a Code Division Multiple Access 2000 (CDMA2000) network, a High-Speed Packet Access (HSPA) network, a Worldwide Interoperability for Microwave Access (WiMAX) network, etc.). Additionally, or alternatively, network 120 may include a virtual network (e.g., a virtual private network (VPN)), a telephone network (e.g., a Public Switched Telephone Network (PSTN)), a cellular network, or another type of network.

Search engine system 130 may include one or more types of computing and/or communication devices. For example, search engine system 130 may include a desktop computer, a server, a cluster of servers, or one or more other types of computing and/or communication devices, which may be co-located or remotely located. Search engine system 130 may be capable of receiving a search from user device 110, identifying one or more documents based on search parameters included in the search, and/or or provide search results (e.g., a list of hyperlinks to the identified documents, a description of the identified documents, etc.) to user device 110. In some implementations, search engine system 130 may cooperate with rank-specific search system 140 to provide search results to user device 110.

Rank-specific search system 140 may include one or more types of computing and/or communication devices. For example, rank-specific search system 140 may include a desktop computer, a server, a cluster of servers, a router, or one or more other types of computing and/or communication devices, which may be co-located or remotely located. Rank-specific search system 140 may be capable of receiving a request originating from user device 110 for a rank-specific search link corresponding to a particular search result. Ranked-based search system 140 may identify one or more search parameters and/or a search result rank corresponding to the search result, create a rank-specific search link associated with the search parameters and the search result rank position, and provide the rank-specific search link to user device 110. In some implementations, rank-specific search system 140 may create a shortened version of the rank-specific search link to enhance the visual appeal and manageability of the rank-specific search link.

Additionally, or alternatively, rank-specific search system 140 may receive a rank-specific search request, corresponding to the rank-specific search link, from user device 110. Rank-specific search system 140 may identify the search parameters and the search result rank associated with the rank-specific search link, obtain search results based on the search parameters, and provide a rank-specific search result, based on the search results and the search result rank, to user device 110. In some implementations, rank-specific search system 140 may cooperate with search engine system 130 to perform one or more operations, such as executing a search based on the search parameters associated with the rank-specific search link.

While search engine system 130 and rank-specific search system 140 are depicted as separate systems, in some implementations, search engine system 130 and rank-specific search system 140 may be combined into the same system.

Figure 2:
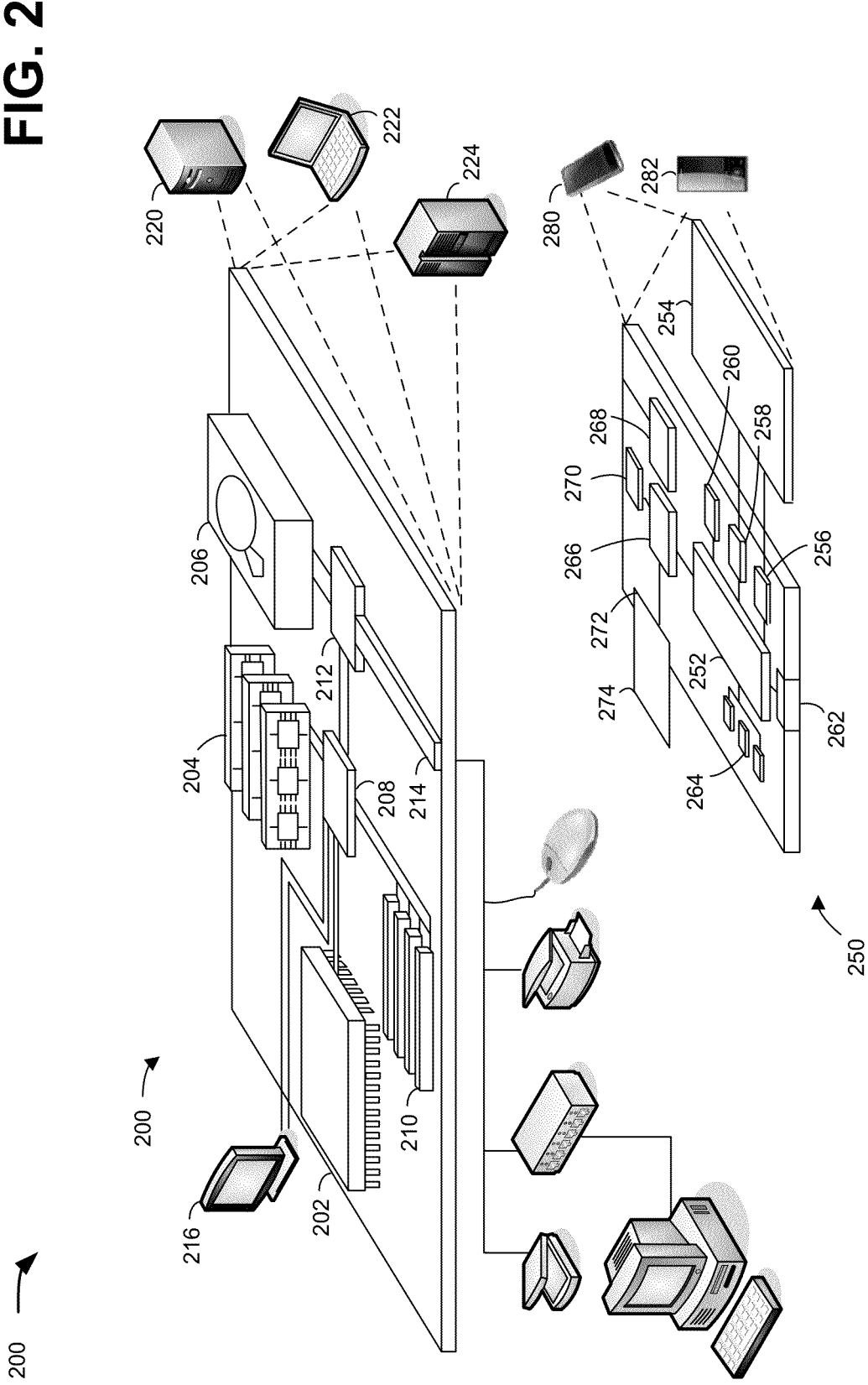
FIG. 2 is a diagram of an example device of FIG. 1.

FIG. 2 is a diagram of an example of a generic computing device 200 and a generic mobile computing device 250, which may be used with the techniques described here. Generic computing device 200 or generic mobile computing device 250 may correspond to, for example, user device 110, search engine system 130, and/or rank-specific search system 140. Computing device 200 is intended to represent various forms of digital computers, such as laptops, desktops, workstations, personal digital assistants, servers, blade servers, mainframes, and other appropriate computers. Mobile computing device 250 is intended to represent various forms of mobile devices, such as personal digital assistants, cellular telephones, smart phones, tablet computers, and other similar computing devices. The components shown in FIG. 2, their connections and relationships, and their functions, are meant to be examples only, and are not meant to limit implementations described herein.

Computing device 200 may include a processor 202, a memory 204, a storage device 206, a high-speed interface 208 connecting to memory 204 and high-speed expansion ports 210, and a low-speed interface 212 connecting to a low-speed expansion port 214 and a storage device 206. Each of components 202, 204, 206, 208, 210, 212, and 214, are interconnected using various buses, and may be mounted on a common motherboard or in other manners as appropriate. Processor 202 can process instructions for execution within computing device 200, including instructions stored in memory 204 or on storage device 206 to display graphical information for a graphical user interface (GUI) on an external input/output device, such as display 216 coupled to high-speed interface 208. In other implementations, multiple processors and/or multiple buses may be used, as appropriate, along with multiple memories and types of memory. Also, multiple computing devices 200 may be connected, with each device providing portions of the necessary operations, as a server bank, a group of blade servers, or a multi-processor system, etc.

Memory 204 stores information within computing device 200. In one implementation, memory 204 includes a volatile memory unit or units. In another implementation, memory 204 may include a non-volatile memory unit or units. Memory 204 may also be another form of computer-readable medium, such as a magnetic or optical disk. A computer-readable medium may refer to a non-transitory memory device. A memory device may refer to storage space within a single storage device or spread across multiple storage devices.

Storage device 206 is capable of providing mass storage for computing device 200. In one implementation, storage device 206 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described herein. The information carrier is a computer or machine-readable medium, such as memory 204, storage device 206, or a memory on processor 202.

High-speed interface 208 manages bandwidth-intensive operations for computing device 200, while low-speed interface 212 manages lower bandwidth-intensive operations. Such allocation of functions is exemplary only. In one implementation, high-speed interface 208 is coupled to memory 204, display 216 (e.g., through a graphics processor or accelerator), and to high-speed expansion ports 210, which may accept various expansion cards (not shown). In this implementation, low-speed interface 212 may be coupled to storage device 206 and low-speed expansion port 214. Low-speed expansion port 214, which may include various communication ports (e.g., USB, Bluetooth, Ethernet, wireless Ethernet, etc.), may be coupled to one or more input/output devices, such as a keyboard, a pointing device, a scanner, or a networking device such as a switch or router, e.g., through a network adapter.

Computing device 200 may be implemented in a number of different forms, as shown in the figure. For example, computing device 200 may be implemented as a standard server, or multiple times in a group of such servers. Computing device 200 may also be implemented as part of a rack server system 224. In addition, computing device 200 may be implemented in a personal computer, such as a laptop computer 222. Alternatively, components from computing device 200 may be combined with other components in a mobile device (not shown), such as mobile computing device 250. Each of such devices may contain one or more of computing devices 200, 250, and an entire system may be made up of multiple computing devices 200, 250 communicating with each other.

Mobile computing device 250 may include a processor 252, a memory 264, an input/output ("I/O") device, such as a display 254, a communication interface 266, and a transceiver 268, among other components. Mobile computing device 250 may also be provided with a storage device, such as a micro-drive or other device, to provide additional storage. Each of the components 252, 264, 254, 266, and 268 are interconnected using various buses, and several of the components may be mounted on a common motherboard or in other manners as appropriate.

Processor 252 can execute instructions within mobile computing device 250, including instructions stored in memory 264. Processor 252 may be implemented as a chipset of chips that include separate and multiple analog and digital processors. Processor 252 may provide, for example, for coordination of the other components of mobile computing device 250, such as control of user interfaces, applications run by mobile computing device 250, and wireless communication by mobile computing device 250.

Processor 252 may communicate with a user through control interface 258 and display interface 256 coupled to a display 254. Display 254 may be, for example, a TFT LCD (Thin-Film-Transistor Liquid Crystal Display) or an OLED (Organic Light Emitting Diode) display, or other appropriate display technology. Display interface 256 may include appropriate circuitry for driving display 254 to present graphical and other information to a user. Control interface 258 may receive commands from a user and convert the commands for submission to processor 252. In addition, an external interface 262 may be provided in communication with processor 252, so as to enable near area communication of mobile computing device 250 with other devices. External interface 262 may provide, for example, for wired communication in some implementations, or for wireless communication in other implementations, and multiple interfaces may also be used.

Memory 264 stores information within mobile computing device 250. Memory 264 can be implemented as one or more of a computer-readable medium or media, a volatile memory unit or units, or a non-volatile memory unit or units. Expansion memory 274 may also be provided and connected to mobile computing device 250 through expansion interface 272, which may include, for example, a SIMM (Single In Line Memory Module) card interface. Such expansion memory 274 may provide extra storage space for device 250, or may also store applications or other information for mobile computing device 250. Specifically, expansion memory 274 may include instructions to carry out or supplement the processes described herein, and may include secure information also. Thus, for example, expansion memory 274 may be provided as a security module for mobile computing device 250, and may be programmed with instructions that permit secure use of mobile computing device 250. In addition, secure applications may be provided via the SIMM cards, along with additional information, such as placing identifying information on the SIMM card in a non-hackable manner.

Expansion memory 274 may include, for example, flash memory and/or NVRAM memory. In one implementation, a computer program product is tangibly embodied in an information carrier. The computer program product contains instructions that, when executed, perform one or more methods, such as those described above. The information carrier is a computer- or machine-readable medium, such as memory 264, expansion memory 274, or a memory on processor 252, that may be received, for example, over transceiver 268 or external interface 262.

Mobile computing device 250 may communicate wirelessly through communication interface 266, which may include digital signal processing circuitry where necessary. Communication interface 266 may provide for communications under various modes or protocols, such as GSM voice calls, Shot Messaging Service (SMS), Enhanced Messaging Service (EMS), or Multimedia Messaging Service (MMS), CDMA, Time Division Multiple Access (TDMA), Personal Digital Cellular (PDC), Wideband CDMA (WCDMA), CDMA2000, or General Packet Radio Service (GPRS), among others. Such communication may occur, for example, through transceiver 268. In addition, short-range communication may occur, such as using a Bluetooth, WiFi, or other such transceiver (not shown). In addition, GPS (Global Positioning System) receiver module 270 may provide additional navigation- and location-related wireless data to mobile computing device 250, which may be used as appropriate by applications running on mobile computing device 250.

Mobile computing device 250 may also communicate audibly using audio codec 260, which may receive spoken information from a user and convert the received spoken information to digital information. Audio codec 260 may likewise generate audible sound for a user, such as through a speaker, e.g., in a handset of mobile computing device 250. Such sound may include sound from voice telephone calls, may include recorded sound (e.g., voice messages, music files, etc.) and may also include sound generated by applications operating on mobile computing device 250.

Mobile computing device 250 may be implemented in a number of different forms, as shown in the figure. For example, mobile computing device 250 may be implemented as a cellular telephone 280. Mobile computing device 250 may also be implemented as part of a smart phone 282, personal digital assistant, or other similar mobile device.

Various implementations of the systems and techniques described herein can be realized in digital electronic circuitry, integrated circuitry, specially designed ASICs (application specific integrated circuits), computer hardware, firmware, software, and/or combinations thereof. These various implementations can include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, or code) include machine instructions for a programmable processor, and can be implemented in a high-level procedural and/or object-oriented programming language, and/or in assembly/machine language. As used herein, the terms "machine-readable medium" and "computer-readable medium" refer to any apparatus and/or device (e.g., magnetic discs, optical disks, memory, Programmable Logic Devices ("PLDs")) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described herein can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described herein can be implemented in a computing system that includes a back end component (e.g., as a data server), or that includes a middleware component (e.g., an application server), or that includes a front end component (e.g., a client computer having a graphical user interface or a web browser through which a user can interact with an implementation of the systems and techniques described here), or any combination of such back end, middleware, or front end components. The components of the system can be interconnected by any form or medium of digital data communication (e.g., a communication network). Examples of communication networks include a LAN, a WAN, and the Internet.

Figure 3:
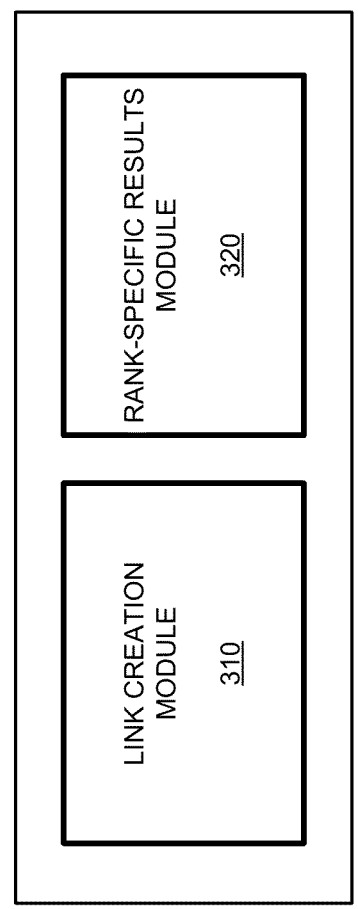
FIG. 3 a diagram of example functional components of a rank-specific search system according to one or more implementations described herein.

FIG. 3 is a diagram of example functional components of rank-specific search system 140 according to one or more implementations described herein. As depicted, rank-specific search system 140 may include link creation module 310 and rank-specific results module 320. Depending on the implementation, one or more of modules 310-320 may be implemented as a combination of hardware and software based on the components illustrated and described with respect to FIG. 2. Alternatively, modules 310-320 may each be implemented as hardware based on the components illustrated and described with respect to FIG. 2.

Link creation module 310 may provide functionality with respect to links. For example, link creation module 310 may receive a request for a rank-specific search link corresponding to a particular search result, and identify a search parameter and a search result rank corresponding to the search result. Link creation module 310 may also, or alternatively, create a rank-specific search link associated with the search parameter and the search result rank, and provide the rank-specific search link to user device 110. In one example, prior to providing the rank-specific search link, rank-specific search system 140 may create a shortened version of the rank-specific search link and associate the shortened version of the rank-specific search link with the search parameter and the search result rank.

Rank-specific results module 320 may provide functionality with respect to rank-specific search results. For example, rank-specific results module 320 may receive a rank-specific query request corresponding to the rank-specific search link and identify a search parameter and a search result rank associated with the rank-specific search link. Additionally, or alternatively, rank-specific results module 320 may obtain a search result based on the search parameters and the search result rank, and provide the search result to user device 110 and/or another system or device.

In addition to the functionality described above, the functional components of rank-specific search system 140 may also, or alternatively, provide functionality as described elsewhere in this description. Further, while FIG. 3 shows a particular number and arrangement of modules, in alternative implementations, rank-specific search system 140 may include additional modules, fewer modules, different modules, or differently arranged modules than those depicted.

Figure 4:
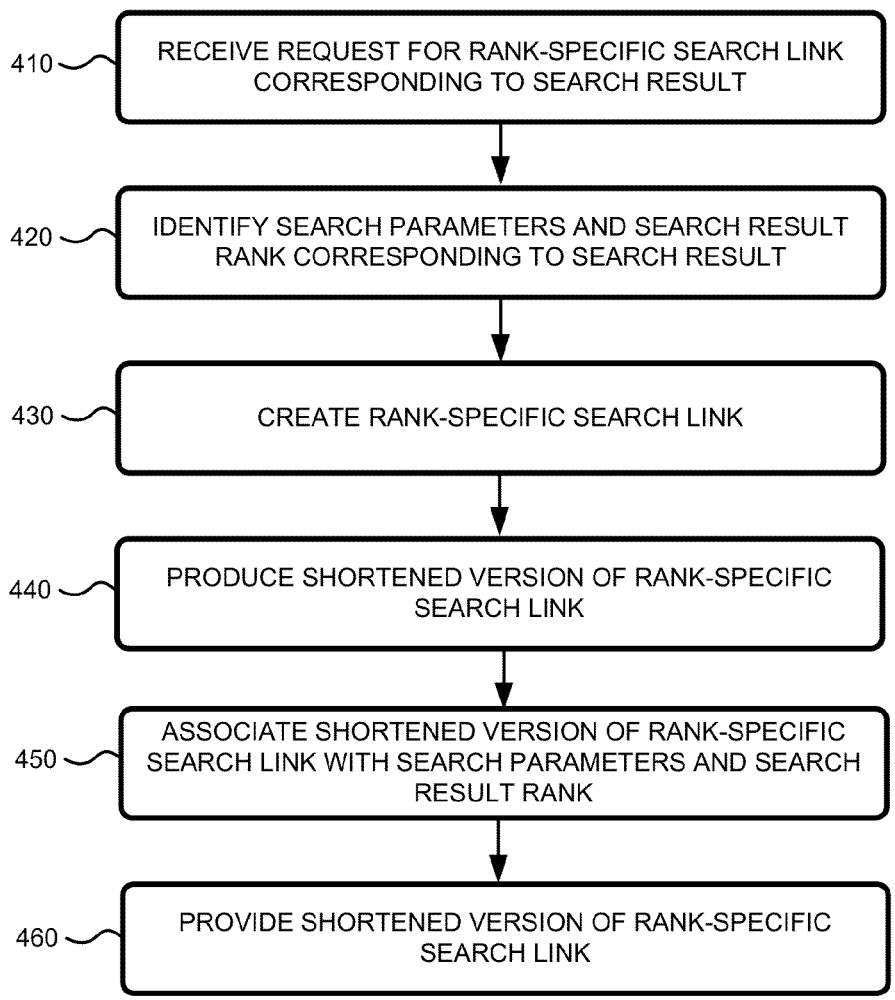
FIG. 4 is a diagram of an example process for creating a rank-specific search link according to one or more implementations described herein.

FIG. 4 is a diagram of an example process 400 for creating a rank-specific search link according to one or more implementations described herein. In some implementations, process 400 may be performed by one or more components of rank-specific search system 140. In other implementations, some or all of process 400 may be performed by one or more other components/devices, or a group of components/devices, including or excluding rank-specific search system 140. A description of FIG. 4 is provided below with reference to FIG. 5.

As shown in FIG. 4, a request for a rank-specific search link corresponding to a search result is received (block 410). For example, assume that a user of user device 110 has been provided a list of search results in a search results document; rank-specific search system 140 may receive a request for a rank-specific search link (see, for example, "Request Link" depicted in FIG. 7) corresponding to a particular search result from among the list of search results. In one example, the request for the rank-specific search link may originate from a user of user device 110 receiving or accessing a list of search results in a search results document and selecting a particular link (or another type of interface object) associated with the search result.

A search parameter and a search result rank corresponding to the search result are identified (block 420). For example, rank-specific search system 140 may identify a search parameter and a search result rank corresponding to the search result. In one example, the search parameters and/or the search result rank may be included in the request for the rank-specific search link. For instance, rank-specific search system 140 may communicate with user device 110, search engine system 130, or another system or device to identify which search parameters were used to execute a search that provided user device 110 with an option to make the request. In a similar manner, rank-specific search system 140 may also, or alternatively, communicate with user device 110, search engine system 130, or another system or device to identify the search result rank corresponding to the request. Alternatively, or additionally, different devices and/or systems may provide the information received by rank-specific search system 140 in a variety of different ways.

As depicted in FIG. 4, a rank-specific search link is created (block 430). For example, rank-specific search system 140 may create a rank-specific search link. The rank-specific search link may be associated with the search parameters and/or the search result rank corresponding to the search result. In one example, selection of the rank-specific search link may be capable of causing a device, such as user device 110, to communicate a rank-specific search request to search engine system 130 and/or rank-specific search system 140.

A shortened version of the rank-specific search link is produced (block 440). For example, rank-specific search system 140 may create a shortened version of the rank-specific search link. The rank-specific search link that is initially created by rank-specific search system 140 may be a relatively long sting of characters, making the rank-specific search link difficult to manage (e.g., format within an e-mail or document) or visually unpleasant. As such, rank-specific search system 140 may produce a shortened version of the rank-specific search link to provide a more manageable and visually appealing link with the same or similar functionality.

As illustrated in FIG. 4, the shortened version of the rank-specific search link is associated with the search parameters and the search result rank (block 450). For instance, rank-specific search system 140 may associate the shortened version of the rank-specific search link with the search parameters and the search result rank. For example, rank-specific search system 140 may create a data structure (e.g., a table entry, a database record, etc.) that indicates a logical relationship between the shortened version of the rank-specific search link, the search parameters, and/or the search result rank. In one example, rank-specific search system 140 may cause the data structure to be stored in a database or another type of data repository, which may be local or remote from rank-specific search system 140.

Figure 5:
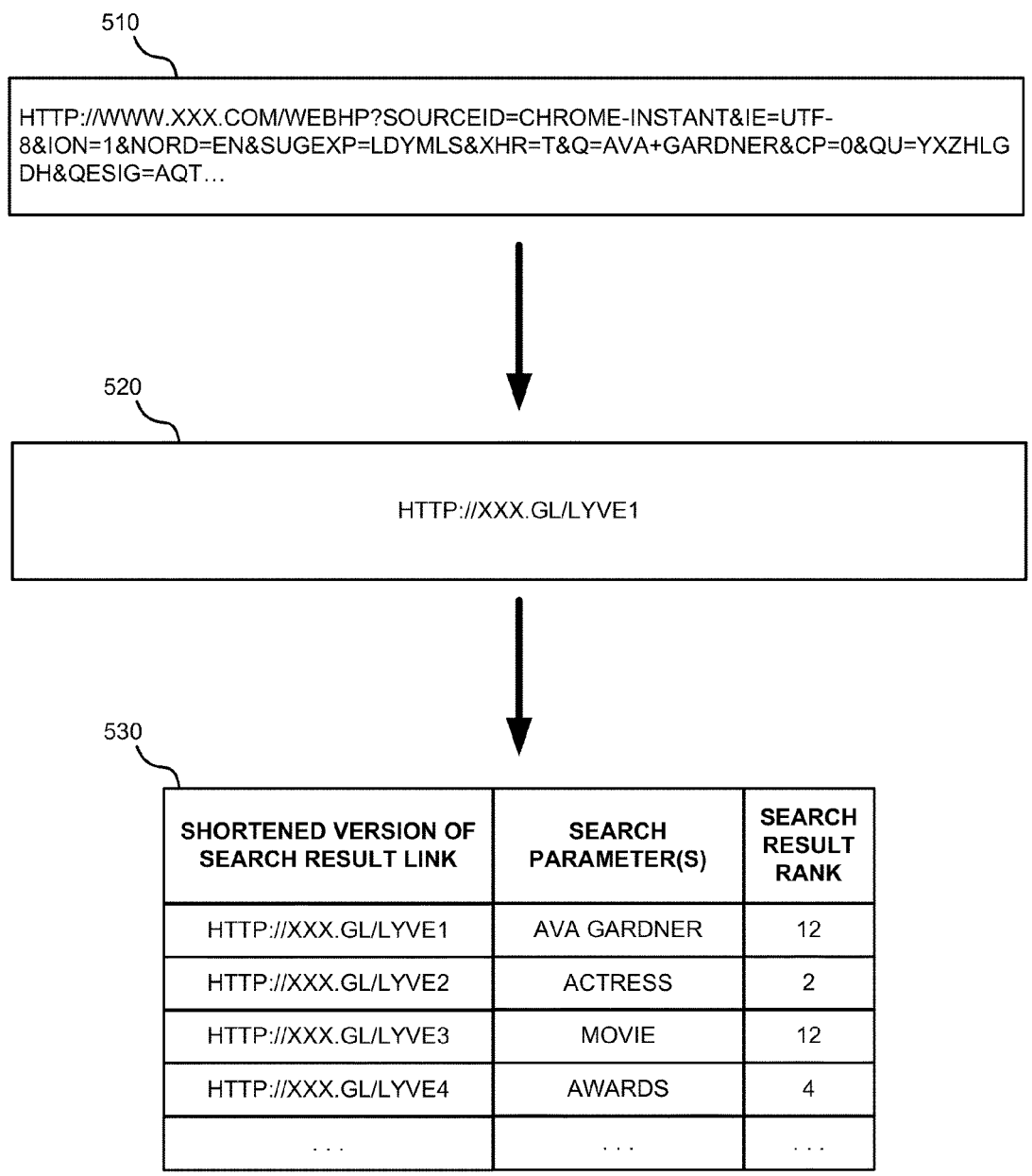
FIG. 5 is a diagram of example data structures according to one or more implementations described herein.

FIG. 5 is a diagram of example data structures 500 according to one or more implementations described herein. As depicted, data structures 500 may include a link 510, a shortened link 520, and an array of associated data 530. While FIG. 5 shows particular types and/or arrangements of information, in alternative implementations, one or more of data structures 500 may include additional information, fewer information, different information, or differently arranged information than depicted in FIG. 5.

Rank-specific search system 140 may create a rank-specific result link, such as hyperlink 510. As represented by hyperlink 510, the rank-specific result link may be a relatively long sequence of characters that lacks manageability and/or visual appeal. Rank-specific search system 140 may produce a shortened version of the rank-specific result link, such as shortened hyperlink 520. Additionally, or alternatively, rank-specific search system 140 may associate the rank-specific result link and/or the shortened version of the rank-specific result link, with one or more search parameters and a search result rank, as represented by array of associated data 530.

As depicted by associated data 530, one column of the associated data may include a shortened version of the search result link (e.g., http://xxx.gl/lyve1, http://xxx.gl.lyve2, etc.). Another column may include the search parameters (e.g., ava garnder, actress, etc.) that were used in producing the search results, and another column may provide the search result rank (e.g., 12, 2, etc.). In some implementations, rank-specific search system 140 may associate the rank-specific result link and/or the shortened version of the rank-specific result link, with one or more additional, or alternatively, types of information, such as a page number, so that the link corresponds to, for example, the third result on page two of a search results document.

Returning now to FIG. 4, process 400 may include providing the shortened version of the rank-specific search link (block 460). For example, rank-specific search system 140 may provide shortened version of the rank-specific search link 520 to the system or device that originated the request for the rank-specific search link (e.g., user device 110). In another example, rank-specific search system 140 may provide shortened version of the rank-specific search link 520 to another system or device.

While FIG. 4 shows a flowchart diagram of an example process 400 for creating a rank-specific search link, in other implementations, a process for creating a rank-specific search link may include fewer operations, different operations, differently arranged operations, or additional operations than depicted in FIG. 4. Additionally, or alternatively, a process for creating a rank-specific search link may be performed without producing a shortened version of the rank-specific search link or associating the shortened version of the rank-specific search link with the search parameters or the search result rank. In such implementations, rank-specific search system 140 may provide the longer or original version of the rank-specific search link mentioned above.

Figure 6:
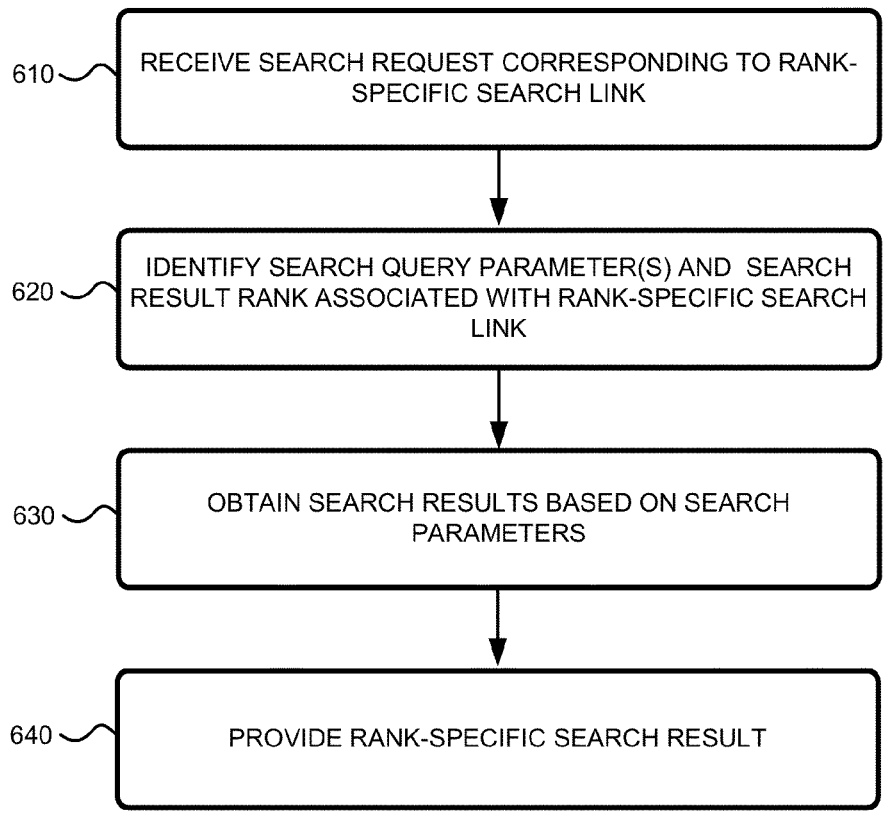
FIG. 6 is a diagram of an example process for providing a rank-specific search result according to one or more implementations described herein.

FIG. 6 is a diagram of an example process 600 for providing a rank-specific search result according to one or more implementations described herein. In one or more implementations, process 600 may be performed by one or more components of rank-specific search system 140. In other implementations, some or all of process 600 may be performed by one or more other components/devices, or a group of components/devices, including or excluding rank-specific search system 140.

As shown in FIG. 6, a search request corresponding to a rank-specific search link is received (block 610). For example, rank-specific search system 140 may receive a search request corresponding to a rank-specific search link. In one example, the search request may be received by rank-specific search system 140 in response to a user of user device 110 selecting a particular hyperlink (e.g., a rank-specific search link) within an e-mail, stored as a bookmark, inserted into a text document, etc.

Search parameters and a search result rank associated with the rank-specific search link are identified (block 620). For example, rank-specific search system 140 may identify a search parameter and a search result rank corresponding to the search request. In one example, rank-specific search system 140 may identify the search parameters and/or search result rank by accessing a local or remote data repository that is designated for storing data structures that associate rank-specific search links with search parameters and/or search result ranks.

As depicted in FIG. 6, search results are obtained based on the search parameters (block 630). For example, rank-specific search system 140 may obtain search results based on the search parameters identified by rank-specific search system 140. In one example, rank-specific search system 140 may obtain the search results by communicating with search engine system 130 and/or receiving the search results from search engine system 130. Alternatively, rank-specific search system 140 may execute a search without the assistance or cooperation of search engine system 130.

A rank-specific search result is provided (block 640). For example, rank-specific search system 140 may provide a rank-specific search result to user device 110. In one example, rank-specific search system 140 may identify a particular search result, corresponding to the search result rank, from among a list of search response obtained by rank-specific search system 140. Additionally, or alternatively, rank-specific search system 140 may provide the search results in a manner that displays or emphasizes the particular search result corresponding to the search result rank.

While FIG. 6 shows a flowchart diagram of an example process 600 for providing a rank-specific search result, in other implementations, a process for providing a rank-specific search result may include fewer operations, different operations, differently arranged operations, or additional operations than depicted in FIG. 6.

Figure 7:
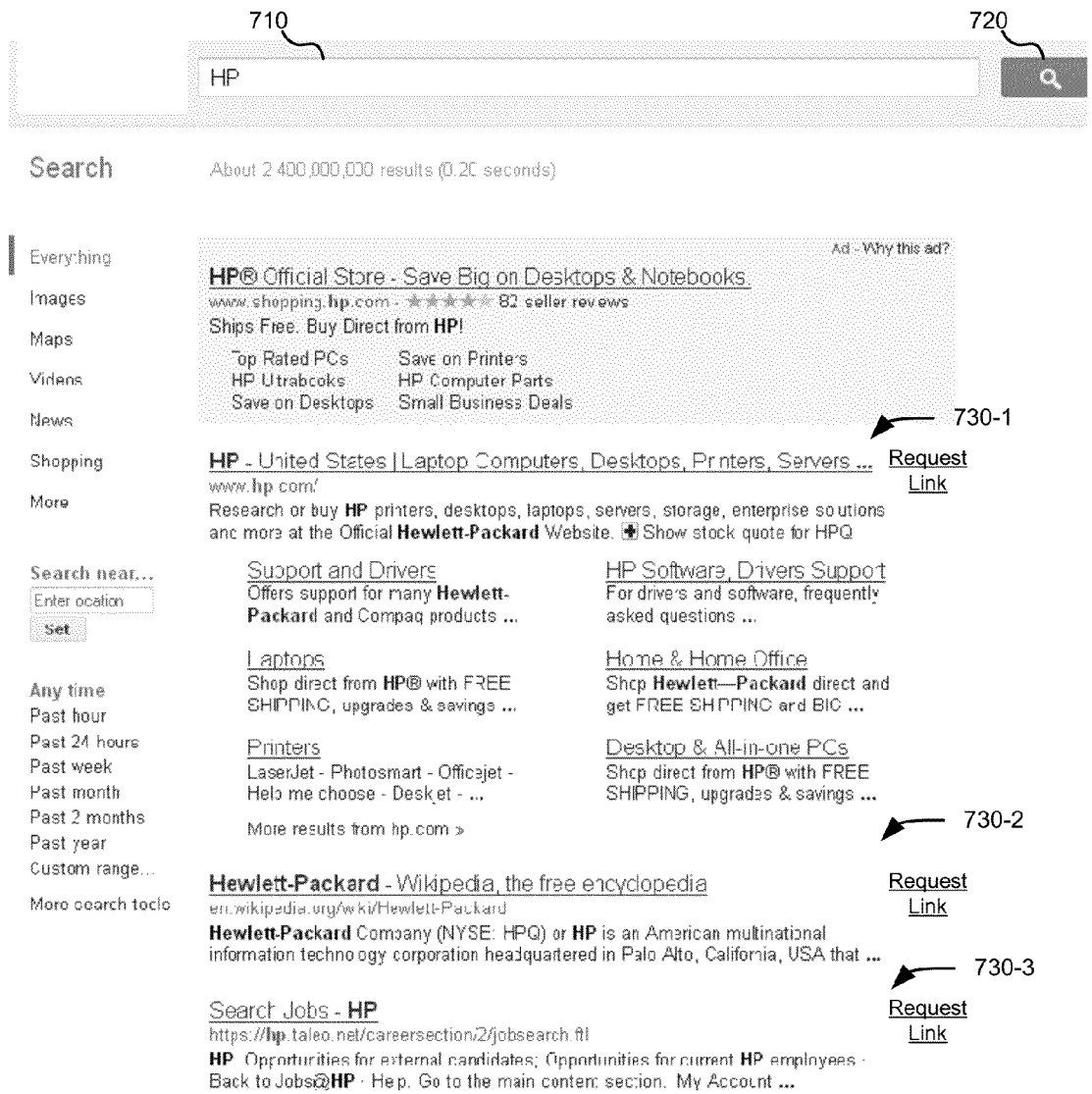
FIG. 7 is a diagram of an example search results document according to one or more implementations described herein.

FIG. 7 is a diagram of an example search results document 700 according to one or more implementations described herein. As depicted, search results document 700 may include a search parameters text box 710, a search command button 720, and search results 730-1, 730-2, and 730-3. While FIG. 7 shows particular types and/or arrangements of information, in alternative implementations, search results document 700 may include additional information, fewer information, different information, or differently arranged information than depicted in FIG. 7.

As depicted in FIG. 7, each search result 730 may include a document title (which may also be a hyperlink to a document address, (e.g., a uniform resource locator (URL)), a document description to provide a short description of the corresponding document, and a document URL. Search results 730 may also, or alternatively, include a "REQUEST LINK" link to enable a user to request rank-specific search link corresponding to a particular search result 730. In some implementations, search results may include additional information, such as a search result rank identifying the result rank, in the form of a number, a letter, and/or another type of character that corresponds to each search result 730. As mentioned above, search results document 700 may be provided to user device 110 in response to communicating a search request to search engine system 130.

In one example, rank-specific search system 140 may create a shortened version of a search result link (e.g., a shortened link), and the shortened link may be used to obtain information regarding a document that is currently ranked or otherwise positioned at the rank position associated with the shortened link. For instance, rank-specific search system 140 may provide the document and/or document information or any other type of relevant search result information when the shortened link is selected or otherwise activated.

Accordingly, a system and a method, described herein, may create rank-specific search links and/or provide rank-specific search results. For example, rank-specific search system 140 may receive a request from user device 110 for a rank-specific search link corresponding to a particular search result 730, and identify search parameters and a search result rank corresponding to the particular search result. In response to the request, ranked-based search system 140 may create a rank-specific search link associated with the search parameters and the search result rank, and provide the rank-specific search link to user device 110.

To enhance the visual appeal and/or manageability of the rank-specific search link, rank-specific search system 140 may create a shortened version of the rank-specific search link and provide the shortened version of the rank-specific search link instead. Rank-specific search system 140 may also, or alternatively, receive a rank-specific search request, corresponding to a rank-specific search link, and identify the search parameters and the search result rank associated with the rank-specific search link. Rank-specific search system 140 may obtain a search result based on the search parameters and the search result rank, and provide the search result to user device 110.

The foregoing description of implementations provides illustration and description, but is not intended to be exhaustive or to limit the implementations to the precise form disclosed. Modifications and variations are possible in light of the above disclosure or may be acquired from practice of the implementations.

For example, while series of blocks have been described with regard to FIGS. 4 and 6, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain implementations may involve a component that performs one or more functions. These components may include hardware, such as an ASIC or a FPGA, or a combination of hardware and software.

Even though particular combinations of features are recited in the claims and/or disclosed in the specification, these combinations are not intended to limit disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential to the implementations unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
    receiving, by a computing device, a request for a rank-specific search link corresponding to a particular search result within a first list of search results of a first search;
    identifying, by the computing device, one or more search parameters used by a search engine to generate the first list of search results, the first list of search results including search results of the first search in a ranked order;
    identifying, by the computing device, a search result rank position of the particular search result in the first list of search results;
    creating, by the computing device, the rank-specific search link associated with:
        the one or more search parameters used to generate the first list of search results, and
        the search result rank position of the particular search result in the first list of search results; and
    providing, by the computing device, the rank-specific search link in accordance with the request,
    where selection of the rank-specific search link causes a second search to be executed using the one or more search parameters and causes information, to be presented, relating to a document ranked at the search result rank position within a second list of search results of the second search.

2. The method of claim 1, where the search result rank position comprises information including:
    a position, within the first list of search results, corresponding to the particular search result.

3. The method of claim 1, further comprising:
    receiving a search request comprising the one or more search parameters;
    producing the first list of search results based on the one or more search parameters; and
    providing the first list of search results in a search results document.

4. The method of claim 3, where:
each search result, in the first list of search results, corresponds to a different search result rank position, and
one of the search results, in the first list of search results, comprises:
a hyperlink corresponding to a search result document associated with the one of the search results, and
an interface object to request the rank-specific search link.

5. The method of claim 1, where the rank-specific search link comprises a different version of another rank-specific search link.

6. The method of claim 1, where the document is a first document,
the method further comprising:
receiving a search request corresponding to the rank-specific search link;
identifying the one or more search parameters associated with the rank-specific search link;
identifying the search result rank position associated with the rank-specific search link;
identifying the second list of search results based on the one or more search parameters;
identifying a search result, included in the second list of search results, that corresponds to the search result rank position within a search results document; and
providing information regarding the search result, where:
the particular search result is associated with a second document and the search result is associated with the first document, the first document and the second document being different documents, and
the particular search result and the search result correspond to the same search result rank position.

7. The method of claim 1, where the particular search result comprises at least one of:
a hyperlink corresponding to a particular document,
a snippet of text from a content of a document description corresponding to a particular document,
a document address corresponding to a particular document, or
a search result rank position corresponding to the particular search result.

8. The method of claim 1, where the search result comprises at least one of:
a hyperlink corresponding to a particular document,
a document description corresponding to the particular document,
a document address corresponding to the particular document, or
a search result rank corresponding to the search result.

9. A system, comprising:
a memory to store instructions; and
one or more processors to perform the instructions to:
receive a search request corresponding to a rank-specific search link,
where the rank-specific search link is associated with one or more search parameters previously used to execute a first search, and
where the rank-specific search link is associated with a search result rank position,
identify the one or more search parameters associated with the rank-specific search link,
identify the search result rank position associated with the rank-specific search link,
execute a second search using the one or more search parameters previously used to execute the first search,
obtain search results based on executing the second search,
identify a rank-specific search result, from among the search results, that is currently ranked at the search result rank position, and
provide information regarding the rank-specific search result in response to the request.

10. The system of claim 9, where the rank-specific search link comprises a different version of another rank-specific search link.

11. The system of claim 9, where the one or more processors are further to:
receive a request for a particular rank-specific search link corresponding to a particular search result within a list of particular search results, the list of particular search results including particular search results in a ranked order,
identify a plurality of particular search parameters corresponding to the list of particular search results,
identify a particular search result rank of the particular search result in the list of particular search results,
create the particular rank-specific search link associated with:
the plurality of particular search parameters corresponding to the list of particular search results, and
the particular search result rank corresponding to the particular search result, and
provide the particular rank-specific search link in accordance with the request.

12. The system of claim 11, where:
the plurality of particular search parameters comprises the one or more search parameters,
the particular search result rank comprises the search result rank position,
the particular rank-specific search link comprises the rank-specific search link, and
the particular search result does not comprise the rank-specific search result.

13. The system of claim 12, where the processor is further to:
receive a search request comprising a set of search parameters,
produce the list of particular search results based on the set of search parameters, and
generate a search results document, where:
each particular search result, in the list of particular search results, corresponds to a different search result rank position, and
the list of particular search results comprises:
a hyperlink corresponding to a particular document, and
an interface object to request the rank-specific search link.

14. The system of claim 9, where the rank-specific search result comprises at least one of:
a hyperlink corresponding to a particular document,
a document description corresponding to the particular document,
a document address corresponding to the particular document, or
a search result rank corresponding to the rank-specific search result.

15. One or more non-transitory computer-readable storage media, comprising:
one or more instructions that, when executed by a processor, cause the processor to:

receive a request for a rank-specific search link corresponding to a particular search result within a first list of search results of a first search, identify one or more search parameters used by a search engine to generate the first list of search results, the first list of search results including search results of the first search in a ranked order, identify a search result rank position of the particular search result in the first list of search results;

create the rank-specific search link associated with:
the one or more search parameters used to generate the first list of search results, and
the search result rank position of the particular search result, create a different version of the rank-specific search link, associate the different version of the rank-specific search link with the one or more search parameters used to generate the first list of search results, associate the different version of the rank-specific search link with the search result rank position of the particular search result, and provide the rank-specific search link based on the request, where selection of the rank-specific search link causes a second search to be executed using the one or more search parameters and causes information, to be presented, relating to a document ranked at the search result rank position within a second list of search results of the second search.

16. The computer-readable storage media of claim 15, where the search result rank comprises information including:

a position, within the first list of search results, corresponding to the particular search result.

17. The computer-readable storage media of claim 15, where the one or more instructions cause the processor to:

receive a search request comprising the one or more search parameters, produce the first list of search results based on the one or more search parameters, and provide the first list of search results in a search results document.

18. The computer-readable storage media of claim 15, where:

each search result, in the first list of search results, corresponds to a different search result rank position, and one of the search results comprises:
a hyperlink corresponding to documents associated with the one of the search results, and
an interface object to request the rank-specific search link.

19. The computer-readable storage media of claim 15, where the one or more instructions cause the processor to:

receive a search request corresponding to a particular rank-specific search link,
where the rank-specific search link is associated with one or more particular search parameters and a particular search result rank position, identify the one or more particular search parameters associated with the particular rank-specific search link, identify the particular search result rank associated with the particular rank-specific search link, obtain a rank-specific search result based on the one or more particular search parameters and corresponding to the particular search result rank, and provide information regarding the rank-specific search result in response to the search request.

20. The computer-readable storage media of claim 15, where the particular search result comprises at least one of:

a hyperlink corresponding to a particular document,
a document description corresponding to the document, or
a document address.

\* \* \* \* \*